US008833863B2

(12) United States Patent
Schmidt et al.

(10) Patent No.: US 8,833,863 B2
(45) Date of Patent: *Sep. 16, 2014

(54) WHEEL ASSEMBLY FOR MOTOR VEHICLES

(71) Applicant: Bayerische Motoren Werke Aktiengesellschaft, Munich (DE)

(72) Inventors: Roland Schmidt, Stockdorf (DE); Josef Boehm, Freising (DE); Johann Dudkowiak, Poecking (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,769

(22) Filed: Mar. 1, 2013

(65) Prior Publication Data
US 2013/0169024 A1 Jul. 4, 2013

Related U.S. Application Data

(63) Continuation of application No. PCT/EP2010/062903, filed on Sep. 2, 2010.

(51) Int. Cl.
B60B 3/04 (2006.01)
B60T 1/06 (2006.01)
B60B 21/02 (2006.01)
B60B 27/00 (2006.01)
B60B 3/08 (2006.01)
B60B 3/14 (2006.01)
B60B 27/06 (2006.01)
F16D 65/02 (2006.01)

(52) U.S. Cl.
CPC .............. B60T 1/065 (2013.01); B60B 21/025 (2013.01); B60B 3/085 (2013.01); B60B 27/0031 (2013.01); B60B 3/14 (2013.01); B60B 27/065 (2013.01); B60B 2310/316 (2013.01); B60Y 2200/10 (2013.01); F16D 2065/1348 (2013.01); F16D 2065/1372 (2013.01); F16D 2065/138 (2013.01); Y02T 10/86 (2013.01)
USPC ..... 301/6.8; 301/6.1; 301/95.104; 301/105.1; 188/18 A; 188/26

(58) Field of Classification Search
CPC ...... B60B 3/041; B60B 3/085; B60B 21/025; B60B 27/0031; B60B 27/0052; B60B 27/0063; B60B 27/0065; B60T 1/065; F16D 65/12; F16D 2065/1348
USPC ............. 301/6.1, 6.3, 6.7, 6.8, 105.1, 95.104; 188/18 A, 26, 218 XL
See application file for complete search history.

(56) References Cited

U.S. PATENT DOCUMENTS 3,051,271 A * 8/1962 Hans Spannagel et al. 188/18 A
3,586,132 A * 6/1971 Tantlinger ................... 188/18 A
(Continued)

FOREIGN PATENT DOCUMENTS

DE   1 113 149 B    8/1961
DE   3446437 A1 *  7/1986
(Continued)

OTHER PUBLICATIONS

International Search Report dated Feb. 14, 2013 including English-language translation (Six (6) pages).
(Continued)

Primary Examiner — Kip T Kotter
(74) Attorney, Agent, or Firm — Crowell & Moring LLP

(57) ABSTRACT

A wheel assembly is configured for suspending the wheel of a motor vehicle on one side and includes a brake disc, which is part of a disc brake and which is fixed, when viewed in the radial direction, to a wheel disc on the outer circumference of the wheel assembly in close vicinity to a wheel rim. The brake caliper of the disc brake surrounds the brake disc over the inner circumference of the brake disc and is fixed to a wheel carrier that supports a stationary ring of a wheel bearing, which has a rotating ring that supports a wheel hub that in turn is connected to the wheel disc. The invention brake disc is fastened to the wheel disc in a floating manner and/or in an elastically flexible manner in the radial direction.

13 Claims, 3 Drawing Sheets

(56) References Cited

U.S. PATENT DOCUMENTS

| | | | |
|---|---|---|---|
| 3,940,159 A | | 2/1976 | Pringle |
| 4,159,832 A | * | 7/1979 | Inbody .................. 280/124.126 |
| 4,226,304 A | * | 10/1980 | Erdmann .................... 188/18 A |
| 4,234,236 A | * | 11/1980 | Inbody ............................ 301/6.7 |
| 4,282,952 A | * | 8/1981 | Bartley ....................... 188/18 A |
| 4,343,380 A | * | 8/1982 | Kawaguchi ................. 188/18 A |
| 4,700,813 A | | 10/1987 | Rath |
| 4,716,993 A | * | 1/1988 | Bass ............................ 188/18 A |
| 4,893,960 A | | 1/1990 | Beier et al. |
| 6,666,303 B2 | | 12/2003 | Torii et al. |
| 7,857,520 B2 | * | 12/2010 | Langer et al. ................. 384/544 |
| 2004/0118643 A1 | | 6/2004 | Booher |
| 2008/0073165 A1 | | 3/2008 | Rau et al. |
| 2008/0143170 A1 | * | 6/2008 | Baumgartner .................. 301/30 |
| 2010/0176651 A1 | * | 7/2010 | Thomas et al. ................. 301/6.8 |

FOREIGN PATENT DOCUMENTS

| | | |
|---|---|---|
| DE | 36 36 243 A1 | 5/1988 |
| DE | 39 31 868 A1 | 4/1991 |
| DE | 101 32 429 A1 | 2/2002 |
| DE | 10 2004 045 327 A1 | 3/2006 |
| EP | 0 183 748 A1 | 6/1986 |
| WO | WO 85/05661 A1 | 12/1985 |
| WO | WO 2005/123418 A1 | 12/2005 |
| WO | WO 2008/006339 A1 | 1/2008 |

OTHER PUBLICATIONS

European Office Action dated Dec. 17, 2013 (five (5) pages).

* cited by examiner

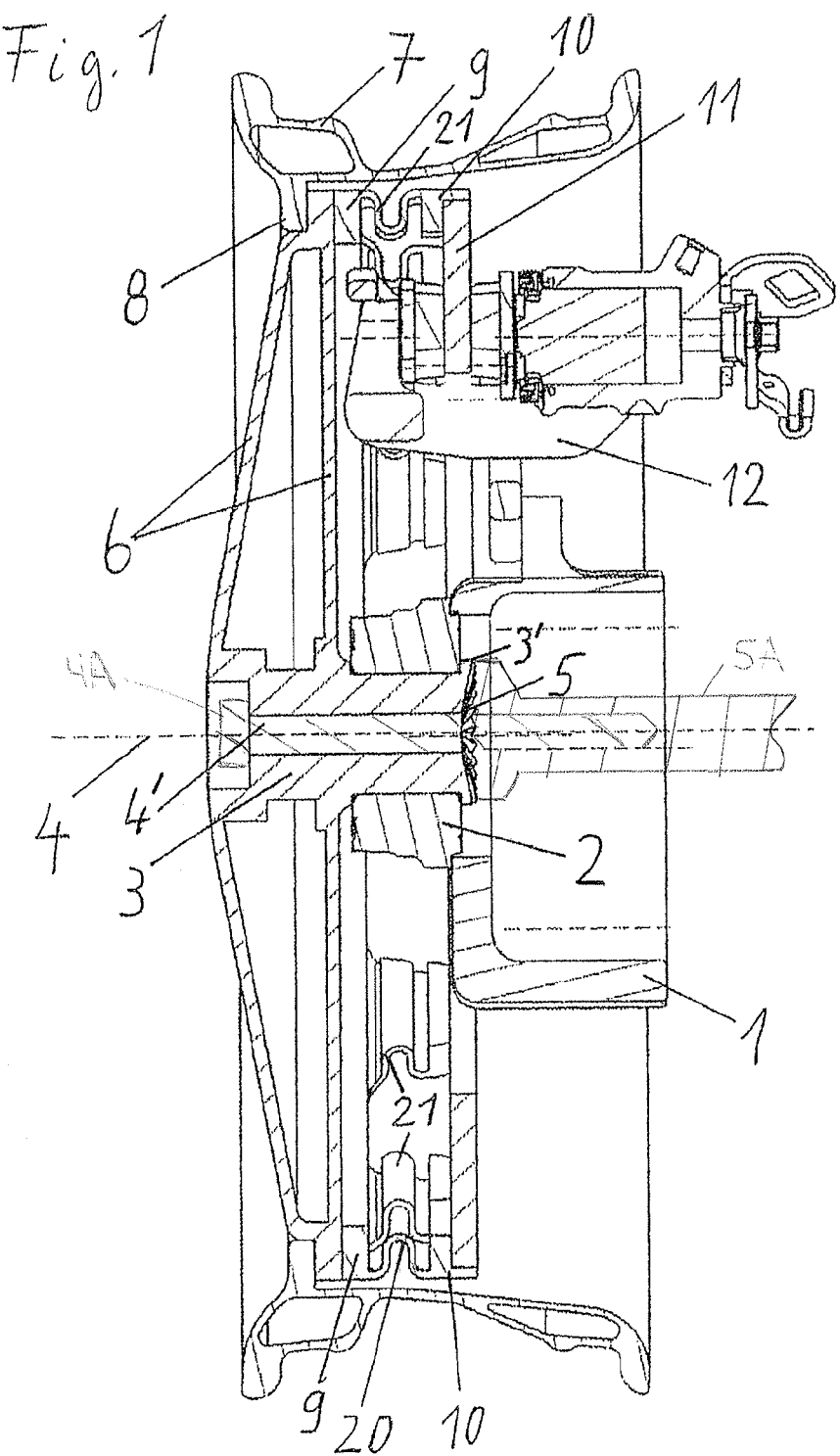

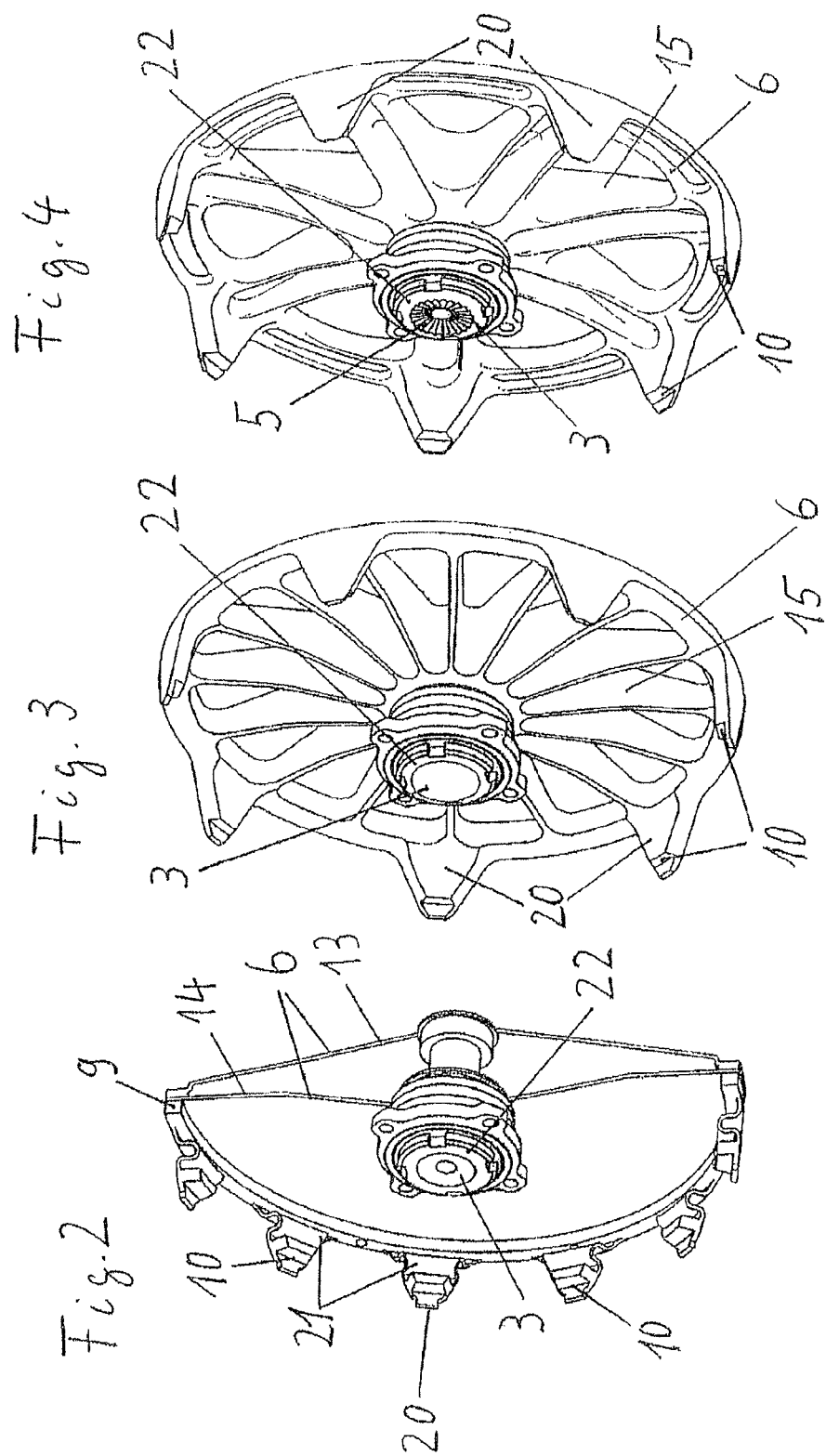

WHEEL ASSEMBLY FOR MOTOR VEHICLES

CROSS REFERENCE TO RELATED APPLICATIONS

This application is a continuation of PCT International Application No. PCT/EP2010/062903, filed Sep. 2, 2010, the entire disclosure of which is herein expressly incorporated by reference.

This application contains subject matter related to U.S. patent application Ser. No. 13/782,581, entitled "Wheel Assembly for Motor Vehicles," filed on even date herewith.

BACKGROUND AND SUMMARY OF THE INVENTION

The invention relates to a wheel assembly for a motor vehicle and, more particularly, to a wheel assembly configured for suspending a wheel of a motor vehicle.

A construction of a conventional wheel and its bearing consists of the following components: a wheel bearing, a wheel hub having a wheel mounting flange and a rim with a tire. The rim is fastened to the wheel mounting flange by means of wheel screws in such a way that a brake disc is clamped between the rim and the wheel mounting flange. Such a wheel bearing arrangement is described in DE 101 32 429 A1. In this case, the maximum friction radius of the brake disc is determined by the following chain of measurements: the inner radius of the wheel rim minus the height of the brake caliper bridge minus half the lining height. Therefore, in the case of high powered vehicles it is often necessary to use a larger rim in order to accommodate the required size of the brake disc.

When dimensioning the brake disc, the aim should be to make the friction radius as large as possible, because it reduces the clamping force of the brake caliper and, thus, its weight. The brake caliper bridge can be dimensioned smaller; and the hydraulic piston of the disc brake can be correspondingly smaller. However, with the diameter of the brake disc, the weight of the brake disc in return increases.

However, it is also possible to achieve a large friction radius if the brake caliper surrounds or grips the brake disc from a radially inner side. That is, the height of the brake caliper bridge is excluded from the chain of measurements. This necessitates that the brake disc be fastened to the rim or that the wheel mounting flange or, more specifically the wheel disc, has to be designed approximately as large as the inside diameter of the rim of the wheel and that the internally surrounded brake disc be fastened thereto.

Such a design is described in EP 018 37 48 A1 as a wheel assembly having a disc brake that is configured for vehicles and includes a disc carrier, which has the shape of a cup and has a base member secured to a wheel hub, as well as a drum member, which extends axially inwards at a small radial spacing from a wheel rim and is securely connected to the radially outer edge of a brake disc. Furthermore, a stationary housing of the wheel bearing supports a brake caliper, which is supported at the radially inner edge of the brake disc, supports the brake pads, which are arranged on both sides of the brake disc and has an actuating device on at least one side of the brake disc. Ventilating channels are present radially inside the wheel rim.

To date an internally surrounded brake disc that is fixed to the rim was known only on motorcycles. The background is that in this case, as compared to the automobile, no significant lateral forces are generated. The wheel bearings sit directly in the wheel, so that the brake disc receptacle can be manufactured with close tolerance to the bearing seats. In contrast, in the case of single sided wheel suspensions, the production tolerances and the deformation of the rim under lateral force are the factors contributing to the elimination of a lateral run-out of a brake disc that is fixed to the rim. The brake pads are pushed back, so that when the brake is applied, the result is an unacceptable dead stroke until the brake pads engage again. In addition, rotational vibrations of the steering wheel are generated. The lateral run-out is controlled by manufacturing the wheel hub flange and the brake disc very precisely. Only the deformation between the wheel carrier and the wheel hub flange has an effect on the lateral run-out. If an internally surrounded brake disc were to be fastened to a conventional rim of such a single sided wheel suspension, then the distortion of the rim alone would exceed the permissible tolerances due to the uneven tightening of the wheel screws.

Changing the wheel with a brake disc that is fixed to the rim is much more difficult, because the disc has to be extracted from the brake caliper during the disassembly and then threaded into the brake caliper during the assembly. The risk of human error occurring during assembly or, for example, the risk of applying the brake when the brake disc is extracted is high.

In order to achieve the necessary lateral run-out in the assembled state for a wheel assembly according to the state of the art, the wheel hub flange on the outer side of the wheel is overtightened together with the wheel bearing on the inner side of the wheel. In this case then the brake disc tolerances accumulate with those of the rim and the tolerances caused by handling, for example, due to uneven tightening of the wheel screws.

The object of the present invention is to provide a wheel assembly that is configured for a motor vehicle and that avoids the aforementioned drawbacks.

The invention achieves this and other objects by providing a wheel assembly that is configured for suspending the wheel of a motor vehicle on one side and that comprises a brake disc, which is part of a disc brake and which is fixed, when viewed in the radial direction, to a wheel disc on the outer circumference of the wheel assembly in close vicinity to a wheel rim. The brake caliper of the disc brake surrounds the brake disc over the inner circumference of the brake disc and is fixed to a wheel carrier that supports a stationary ring of a wheel bearing, which has a rotating ring that supports a wheel hub that in turn is connected to the wheel disc. The brake disc is fastened to the wheel disc in a floating manner and/or in an elastically flexible manner in the radial direction. This feature can be achieved, for example, with a retaining ring, which is elastically flexible in the radial direction and which is fixed to the wheel disc. Such a brake disc holder can be easily designed in an elastic manner owing to the low force level of the brake force applied a long way on the outside, a feature that allows the brake disc to expand without restriction in an advantageous way. As a result, a so-called cupping of the brake disc is avoided; and local axial deformations of the wheel disc under lateral force are not transmitted to the brake disc.

If the wheel is split into two functional units so that the wheel screws connect the wheel rim to the wheel disc, then a wheel hub flange, which exhibits a significantly enlarged diameter and which also supports the internally surrounded brake disc, remains on the vehicle when the wheel is disassembled. Then, when changing the tire, the wheel rim is unscrewed, as the tire carrier, from the wheel disc.

The brake disc can dispense with the securely connected cup and, hence, can be punched advantageously from a sheet, a feature that offers advantages with respect to weight and cost. Moreover, the smaller amount of required clamping force due to the larger friction radius reduces the weight of the brake caliper, whereas the possibility of a large installation space for the brake caliper bridge permits high rigidity in conjunction with less weight. In addition, an improved transmission ratio enables a smaller brake force booster.

In addition, a non-driven wheel can be designed specifically for lateral force, because no driving or braking torques are introduced by way of the wheel disc, a feature that also offers advantages with respect to weight.

Advantageous embodiments of the invention provide that the wheel hub is connected to a drive shaft on the side of the wheel bearing that lies inside the wheel by means of a spur toothing, in particular, a Voith Hirth coupling. Then, the axial prestress of the spur toothing can be achieved in an advantageous way by use of a push-through screw that is accessible on the side of the wheel hub that lies outside the wheel; and the push-through screw extends through the wheel hub in the axial direction. For a driven wheel this arrangement allows the wheel disc or, in the case of a one piece component composed of wheel hub and wheel disc, this arrangement allows the latter to be easily removed by loosening the push-through screw and the wheel bearing screws. Such a feature significantly simplifies the maintenance work, for example, on the brake.

In addition, it is advantageous for the wheel rim to be made of an extruded hollow chamber profile. In an especially advantageous embodiment of the invention, the wheel rim and/or the wheel disc can be made of aluminum or magnesium or of a synthetic plastic material, in particular, reinforced with carbon fibers or glass fibers. In this case the wheel hub and the wheel disc can also be made in one piece or composed of different materials. Since the wheel hub and the wheel disc are constructed at least preferably in one piece, the result is a wide scope of design options; and in terms of the structure and materials without the restrictions that are associated with a screw connection of the wheel according to the state of the art. In this case all of the forces and moments have to be transmitted from the wheel hub flange over the screw connection to the rim. A one-piece component exhibits advantageously a higher stiffness in conjunction with an improved non-positive connection. The rim base can be made of a bent extruded profile, so that the result is that the rim base is also stiffer compared to a conventional rim, because the largest proportion of the material may be found in close vicinity to the neutral fibers. Inexpensive twin rims, for example, for winter tires, are possible or in the case of replacement due to damages, because only the rim band has to be replaced.

The wheel unit and the brake caliper can be configured in such a way that they can be easily replaced, as compared to a wheel or a brake according to the state of the art. As a result, a solution according to the invention can be used, for example, only for high powered vehicles, whereas the less powerful variants can be equipped in parallel with a wheel and brake system according to the state of the art. This arrangement lends itself especially well to expensive wheel designs, such as, for example, wheel designs in carbon fibers. Similarly, retrofitting in the accessory business is also conceivable with this arrangement.

A particularly advantageous embodiment of the invention is characterized in that the wheel bearing is secured over its inner ring on the wheel hub on the inner side of the wheel by means of a cap nut. As an alternative, the wheel bearing can also be secured over its inner ring on the wheel hub on the inner side of the wheel by means of an enlargement of the outer diameter of the wheel hub, in particular by beading. In this case the enlargement of the outer diameter of the wheel hub for securing the wheel bearing can be achieved within the framework of manufacturing the spur toothing on the wheel hub. In particular, this can be done by way of a clamping element within a clamping process for the wheel hub and, in particular, in one working step. Therefore, a connection, which cannot be loosened at least in the case of service, is advantageous, because the receptacle for the brake disc and the receptacle for the rim base can be overtightened in the assembled state with the wheel bearing; and, thus, a maximum amount of lateral run-out is achieved. This applies especially if the brake disc holder and the wheel disc are constructed in one piece. In addition, the elimination of the conventional wheel hub flange makes it possible for the width of the wheel bearing to be larger whereas the diameter of the wheel bearing is smaller, so that the result is less bearing and sealing friction or that the depth of the wheel disc can be larger for high rigidity.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows an exemplary inventive wheel assembly with a wheel disc in a metal casting design;

FIG. 2 shows a wheel disc for an exemplary inventive wheel assembly in a sheet metal shell design;

FIG. 3 shows a wheel disc for an exemplary inventive wheel assembly with cast spokes as the non-driven wheel;

FIG. 4 shows a wheel disc for an exemplary inventive wheel assembly with cast spokes as the driven wheel.

DETAILED DESCRIPTION OF THE DRAWINGS

Figure 5:
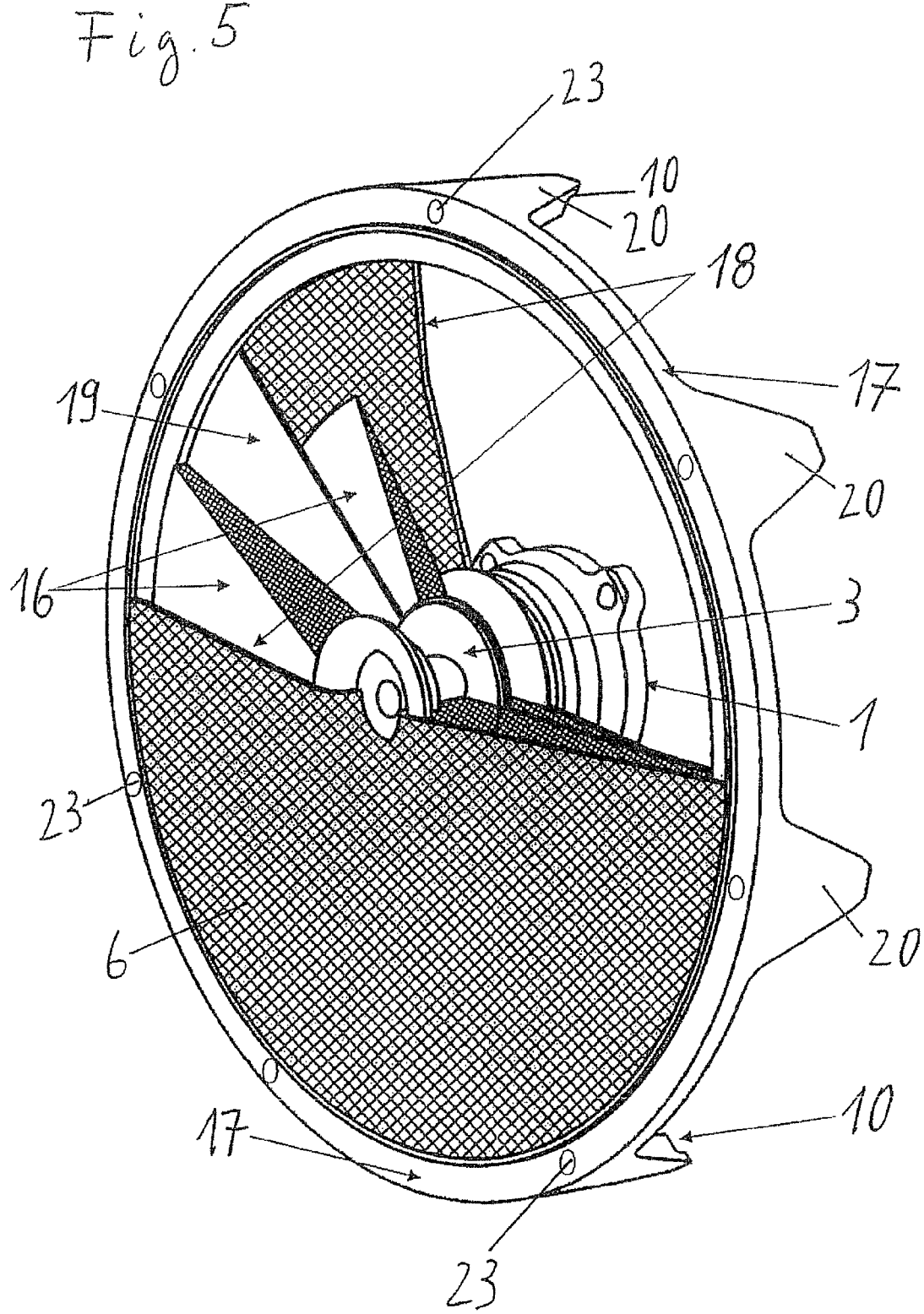
FIG. 5 shows a wheel disc for an exemplary inventive wheel assembly in a sandwich construction.

The wheel assembly shown in FIG. 1 is assigned to a wheel carrier 1, which secures an outer ring of a wheel bearing 2, which is shown only partially. The inner ring of the wheel bearing 2 supports a wheel hub 3 in such a way that it can be driven in rotation about an axis 4 that is indicated by the dashed line. In this respect, the wheel bearing 2 is secured over its inner ring on the wheel hub on the inner side of the wheel by way of an outer diameter 3' of the wheel hub 3 that is enlarged by beading. In this case, the enlarged outer diameter 3' is manufactured within the framework of manufacturing a spur toothing 5, in order to connect to a drive shaft 5A. This is done preferably within a clamping process for the wheel hub 3, preferably in one working step.

The wheel hub 3 is connected to a shaft pin of the drive shaft by way of the spur toothing 5, formed, in particular, as a Voith Hirth coupling, on the side of the wheel bearing 2 that lies inside the wheel. The axial prestress of the spur toothing 5 is achieved by means of a push-through screw 4A that is accessible on the side of the wheel hub 3 that lies outside the wheel; and this push-through screw extends through the wheel hub in a drilled hole 4' in the axial direction.

The double walled wheel disc 6, which is constructed in one piece with the wheel hub 3 that is made of aluminum or magnesium, extends on the side outside the wheel in the radial direction as far as a wheel rim 7. The wheel rim 7 is made of an extruded hollow chamber profile, with an inwardly projecting screw connection collar 8, which has drilled holes (not illustrated), by means of which the wheel rim 7 is connected to a rim carrier ring 9 of a brake disc holder 20 by means of wheel screws, which are not shown, through corresponding drilled holes (not illustrated) on the outer circumference of the wheel disc 6. The brake disc holder 20 is configured so as to be elastically flexible in the radial direction and carries on its inwardly oriented brake disc receptacle 10 a brake disc 11 of a disc brake having a brake caliper 12 that surrounds or grips the brake disc 11 over its inner circumference and is fixed to the wheel carrier 1. It is possible to design the brake disc holder 20 in such a way that it is elastically flexible in the radial direction by arranging connecting elements 21, which are spaced apart in the circumferential direction, between the rim carrier ring 9 and the brake disc receptacle 10 of the brake disc holder 20 with a U-shaped loop having a wall thickness that is adequately small for the necessary elasticity. As a result, the brake disc holder 20 consists of a rim carrier ring 9, connecting elements 21, which are elastic in the radial direction, and a brake disc receptacle 10.

FIG. 2 shows an embodiment of the invention corresponding to FIG. 1, but with the distinct difference that the wheel disc 6 is not constructed as a casting, but rather as a sheet metal shell and, therefore, is not constructed, but rather is built in one piece with the wheel hub 3. In order to transmit the torque, a sheet metal shell lying on the outer side of the wheel 13 and a sheet metal shell lying on the inner side of the wheel 14 are securely connected in each instance to the wheel rim 7 and to the rim carrier ring 9 or, more specifically, the wheel hub 3 on the outer circumference or on the inner circumference respectively of the pertinent sheet metal shell. The connection on the outer circumference with the rim, which is not shown, by way of the rim carrier ring 9 with the brake disc holder 20 corresponds to the connection described with respect to FIG. 1. Another difference with respect to FIG. 1 lies also in the securing of the installed wheel bearing 2, which cannot be seen, by means of a cap nut 22 on the wheel hub 3.

This difference with respect to FIG. 1 also exists in FIGS. 3 and 4. Moreover, in addition to FIGS. 1 and 2, FIGS. 3 and 4 also show in each instance a wheel disc 6 with wheel spokes 15, connected to a driven and/or following wheel hub 3. The driven wheel hub 3 has the spur toothing 5. The material for the wheel discs 6, which can be cast or also extruded in molds, can be both a light metal and a synthetic plastic material, in particular, fiber reinforced. In this case, the brake disc holder 20 with the brake disc receptacle 10 is constructed in one piece with the wheel disc 6. However, the brake disc could also be fastened in accordance with FIG. 1 by way of a rim carrier ring 9 with the brake disc holder 20. In the one piece design with the wheel disc 6, the adequate elasticity in the radial direction is achieved by means of the choice of wall thickness for the brake disc holders 20 that varies as a function of the material. In the present embodiment the wheel discs 6 are made of a synthetic plastic material.

In contrast, FIG. 5 shows an embodiment of the invention that is constructed of a synthetic plastic material and metal and includes a brake disc receptacle 10 corresponding to that depicted in FIGS. 3 and 4, but with the major difference that the wheel disc 6 is constructed of carbon fiber layers in the manner of a sandwich. The wheel hub 3 and a carrier ring 17 for the wheel rim 7 and the brake disc 11 (neither one is depicted in this figure) are laminated into the wheel disc 6 by way of its plastic shells 18, reinforced with carbon fibers and/or carbon fabric. Between the plastic shells 18 there is a so-called sandwich fill material 16, for example, made of foamed plastic, and a ductile steel sheet inlay 19. As an alternative, the carrier ring 17 can also be constructed in a manner analogous to the rim carrier ring 9 with elastic connecting elements 21 from FIG. 1 at least on the inner side of the wheel, as far as to the brake disc receptacle 10. Otherwise in the present embodiment the drilled holes 23, which are not shown anywhere else, can be seen for the wheel screws (not illustrated), with which the wheel rim 7 (FIG. 1) is connected to the carrier ring 17 of the brake disc holder 20 by way of the inwardly projecting screw connection collar 8 of the wheel rim on the outer circumference of the wheel disc 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel assembly configured for suspending a wheel of a motor vehicle on one side, the wheel assembly comprising:
   a brake disc, which is part of a disc brake and which is fixed, when viewed in a radial direction;
   a brake disc holder arranged to receive and support the brake disc in the radial direction and in an axial direction;
   a wheel disc extending radially outward from a wheel hub toward an outer circumference of said wheel assembly; and
   a wheel rim having an extruded hollow profile chamber radially outboard of the wheel disc and an integrally-formed radially-inward projecting connecting collar arranged to be fixed to radially-outer peripheral regions of the wheel disc and the brake disc holder,
   wherein
   a brake caliper of said disc brake surrounds the brake disc over an inner circumference of said brake disc and is fixed to a wheel carrier that supports a stationary ring of a wheel bearing, the wheel bearing having a rotating ring that supports the wheel hub that in turn is connected to the wheel disc;
   the brake disc is fastened to the wheel disc via a rim carrier ring of the brake disc holder in at least one of a floating and an elastically flexible manner in the radial direction with a plurality of connecting segments between the brake disc and the wheel disc in the radially-outer peripheral region of the brake disc holder adjacent to the wheel rim, each of the connecting segments having a radially-oriented fold,
   the wheel hub is connected to a drive shaft on a side of the wheel bearing that lies inside the wheel via a Voith Hirth coupling, and
   the brake disc holder is elastically flexible in the radial direction and the rim carrier ring of the brake holder is located at the radially-outer peripheral regions of the wheel disc without contact with the wheel hub.

2. The wheel assembly as claimed in claim 1, wherein the axial prestress of the Voith Hirth coupling is achieved by a push-through screw that is accessible on the side of the wheel hub that lies outside the wheel; and said push-through screw extends through said wheel hub in the axial direction.

3. The wheel assembly as claimed in claim 1, wherein the wheel hub and the wheel disc are made in one piece.

4. The wheel assembly as claimed in claim 1, wherein at least one of the wheel rim and the wheel disc is made of aluminum, magnesium or a synthetic plastic material.

5. The wheel assembly as claimed in claim 4, wherein the synthetic plastic material is reinforced with carbon fibers or glass fibers.

6. The wheel assembly as claimed in claim 1, wherein the wheel bearing is secured over its inner ring on the wheel hub on the inner side of the wheel by a cap nut.

7. The wheel assembly as claimed in claim 1, wherein the wheel bearing is secured over its inner ring on the wheel hub on the inner side of the wheel by an enlargement of the outer diameter of the wheel hub.

8. The wheel assembly as claimed in claim 7, wherein the enlargement is a beading.

9. The wheel assembly as claimed in claim 7, wherein the enlargement of the outer diameter of the wheel hub for securing the wheel bearing is achieved in manufacturing the Voith Hirth coupling on the wheel hub.

10. The wheel assembly as claimed in claim 9, wherein the enlargement of the outer diameter for securing the wheel bearing and the manufacture of the the Voith Hirth coupling on the wheel hub are carried out by a clamping element within a clamping process for the wheel hub in one working step.

11. The wheel assembly as claimed in claim 1, wherein the wheel disc is formed from at least two disc layers located axially outward of the wheel bearing.

12. The wheel assembly of claim 11, wherein
the at least two disc layers are axially separated near the wheel hub, and
are integrally formed with the wheel hub.

13. The wheel assembly of claim 11, wherein
the at least two disc layers are axially separated near the wheel hub, and
the at least two disc layers are connected at their respective inner radii to the wheel hub.

* * * * *